US011511526B2

(12) United States Patent
Borchmann et al.

(10) Patent No.: US 11,511,526 B2
(45) Date of Patent: Nov. 29, 2022

(54) ALIGNING AND LAMINATING METHOD FOR THE PRODUCTION OF THIN LAMINATED GLASS FROM GLASS PANES WHICH DO NOT FIT TOGETHER ACCURATELY

(71) Applicant: SAINT-GOBAIN GLASS FRANCE, Courbevoie (FR)

(72) Inventors: Nikolai Borchmann, Herzogenrath (DE); Stefan Lücke, Spenge (DE); Simon Breuer, Baesweiler (DE); Nino Tings, Eschweiler (DE)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 369 days.

(21) Appl. No.: 16/757,132

(22) PCT Filed: Sep. 26, 2018

(86) PCT No.: PCT/EP2018/076100
§ 371 (c)(1),
(2) Date: Apr. 17, 2020

(87) PCT Pub. No.: WO2019/076597
PCT Pub. Date: Apr. 25, 2019

(65) Prior Publication Data
US 2020/0247093 A1    Aug. 6, 2020

(30) Foreign Application Priority Data
Oct. 18, 2017  (EP) .................................. 17197145

(51) Int. Cl.
B32B 17/10      (2006.01)
B32B 37/06      (2006.01)
(Continued)

(52) U.S. Cl.
CPC .. *B32B 17/10871* (2013.01); *B32B 17/10036* (2013.01); *B32B 17/10761* (2013.01);
(Continued)

(58) Field of Classification Search
CPC ........ B32B 17/10871; B32B 17/10036; B32B 17/10761; B32B 17/10935;
(Continued)

(56) References Cited

U.S. PATENT DOCUMENTS 3,444,732 A  *  5/1969  McKinley ........... B29C 66/9221
                                                        156/64
3,826,701 A  *  7/1974  Miller ................. B29C 66/1122
                                                        156/308.2
(Continued)

FOREIGN PATENT DOCUMENTS

CN        1617796 A       5/2005
CN      101060976 A      10/2007
(Continued)

OTHER PUBLICATIONS

International Search Report as issued in International Patent Application No. PCT/EP2018/076100, dated Dec. 7, 2018.

*Primary Examiner* — George R Koch
*Assistant Examiner* — Christopher C Caillouet
(74) *Attorney, Agent, or Firm* — Pillsbury Winthrop Shaw Pittman LLP

(57) ABSTRACT

A method for producing laminated glass or a precursor thereof using a first glass pane with a thickness of at least 1.4 mm and a second glass pane with a thickness of not more than 1.0 mm, the first and second glass panes differing in curvature and/or locally in shape, includes aligning an arrangement including the first and second glass panes and a laminating film by positioning a side edge of the arrangement against a stop element; pre-fixing the aligned arrange-
(Continued)

Figure 1:
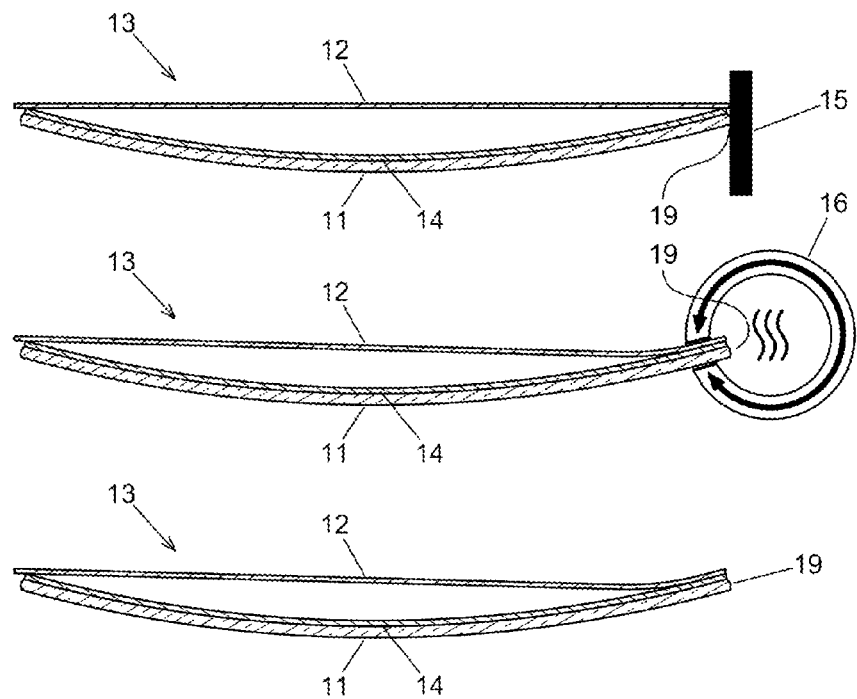

ment at at least two locations on the positioned side edge of the arrangement by one or more fixing elements and heating, after which the fixing element or elements are removed again; and forming a fixed arrangement by passing the pre-fixed arrangement through a roller arrangement with the pre-fixed side edge of the arrangement ahead. The arrangement is heated in sections during passage.

20 Claims, 3 Drawing Sheets

(51) Int. Cl.
    *B32B 27/30*     (2006.01)
    *B32B 37/00*     (2006.01)
    *B32B 37/10*     (2006.01)
    *B32B 37/18*     (2006.01)
    *B32B 38/18*     (2006.01)
    *B60J 1/08*     (2006.01)

(52) U.S. Cl.
    CPC .. *B32B 17/10935* (2013.01); *B32B 17/10972* (2013.01); *B32B 27/30* (2013.01); *B32B 37/0053* (2013.01); *B32B 37/06* (2013.01); *B32B 37/10* (2013.01); *B32B 37/182* (2013.01); *B32B 38/1841* (2013.01); *B60J 1/08* (2013.01); *B32B 2250/03* (2013.01); *B32B 2250/40* (2013.01); *B32B 2309/02* (2013.01); *B32B 2315/08* (2013.01); *B32B 2329/06* (2013.01); *B32B 2605/006* (2013.01); *B32B 2605/08* (2013.01)

(58) Field of Classification Search
    CPC .............. B32B 17/10972; B32B 27/30; B32B 37/0053; B32B 37/06; B32B 37/10; B32B 37/182; B32B 38/1841; B32B 2250/03; B32B 2250/40; B32B 2309/02; B32B 2315/08; B32B 2329/06; B32B 2605/006; B32B 2605/08; B32B 17/10816; B60J 1/08

See application file for complete search history.

(56) References Cited

U.S. PATENT DOCUMENTS

| | | | |
|---|---|---|---|
| 3,925,139 A | * | 12/1975 | Simmons .......... B29C 66/91313 340/657 |
| 2007/0223096 A1 | | 9/2007 | O'Connor et al. |
| 2012/0160422 A1 | * | 6/2012 | Mori ..................... B32B 37/10 156/391 |
| 2017/0036414 A1 | | 2/2017 | Notsu et al. |
| 2017/0190152 A1 | * | 7/2017 | Notsu ............... B32B 17/10155 |
| 2019/0061324 A1 | * | 2/2019 | Mukherji ................ B32B 5/022 |

FOREIGN PATENT DOCUMENTS

| | | |
|---|---|---|
| CN | 106164006 A | 11/2016 |
| CN | 106414065 A | 2/2017 |
| CN | 106431019 A | 2/2017 |
| CN | 107087401 A | 8/2017 |
| DE | 37 28 284 A1 | 4/1989 |
| DE | 41 06 958 A1 | 9/1992 |
| DE | 10 2006 054736 A1 | 5/2008 |
| EP | 3 189 965 A1 | 7/2017 |
| FR | 3 012 073 A1 | 4/2015 |
| GB | 908338 A | 10/1962 |
| WO | WO 2006/051163 | 5/2006 |

* cited by examiner

ALIGNING AND LAMINATING METHOD FOR THE PRODUCTION OF THIN LAMINATED GLASS FROM GLASS PANES WHICH DO NOT FIT TOGETHER ACCURATELY

CROSS-REFERENCE TO RELATED APPLICATIONS

This application is the U.S. National Stage of PCT/EP2018/076100, filed Sep. 26, 2018, which in turn claims priority to European patent application number 17197145.0 filed Oct. 18, 2017. The content of these applications are incorporated herein by reference in their entireties.

The invention relates to a method for the production of laminated glass or a precursor thereof.

Laminated glass or a laminated glass pane consists of at least one first pane or outer pane, one second pane or inner pane, and one polymeric intermediate layer that joins the first pane to the second pane. Laminated glass is used, for example, as vehicle windows or window panes for buildings. Laminated glass can be flat or bent laminated glass.

For economic and ecological reasons, the goal is to produce the thinnest possible laminated glass. Here, the term "thin laminated glass" means laminated glass in which one of the two glass panes has a thickness of no more than 1.0 mm. The other glass pane of the laminated glass can have standard glass thicknesses, usually a thickness of at least 1.4 mm, e.g., 1.6 mm.

Known methods for producing laminated glass usually include the arrangement of a first pane, one or a plurality of laminating films, and a second pane, the deaeration of the arrangement obtained while forming a pre-laminate, and heat and/or pressure treatment of the pre-laminate obtained in order to obtain the finished laminated glass pane. If a bent laminated glass is to be produced, it is also necessary to bend the glass panes before forming the arrangement.

Usually, the glass panes used fit together substantially in curvature and shape such that they can be placed together relatively precisely and aligned to form the arrangement. There are, however, cases in which the two glass panes for producing the laminated glass do not fit together accurately in terms of geometry, i.e., they differ in curvature and/or locally in shape. This can, for example, result from flaws in the production process of the glass panes used or from the process technology.

Due to a lack of geometric accuracy of fit of the two glass panes, the arrangement resulting from the placement of the panes together has intermediate spaces or gaps, alignment of the arrangement is rendered more difficult, and problems arise in the subsequent production steps for manufacture of the laminated glass. Of course, these problems become all the greater the more pronounced the lack of geometric accuracy of fit. The consequences can, for example, be errors or inaccuracies in the alignment of the panes in the laminated glass obtained. When the lack of accuracy of fit is too pronounced, it is no longer possible to align the panes with one another with the required precision using known prior art methods.

EP 3189965 A1 relates to a laminated sheet that includes a first and second pane wherein the first pane is thicker than the second pane, the first pane has a linearly beveled part in the outer circumference, and the second pane is positioned offset on an extended line of the linearly beveled part of the first pane. The curvature of the first and the second pane can be different.

FR 3012073 A1 relates to a curved laminated glass unit with an outer glass pane and an inner glass pane, wherein the inner glass pane is thinner than the outer glass pane, and a method for producing the laminated glass that can include cold bending of the inner glass pane.

GB 908338 A describes a method for producing planar or curved laminated glass in which an arrangement of two thin glass panes and intermediate layers is fixed between two cover plates using clamps or other gripping means around the entire circumference of the arrangement and then the arrangement thus fixed is laminated in an autoclave.

US 2007/223096 A1 describes a reflector in which components of a glass laminate are fixed with clamps.

DE 102006054736 A1 relates to a method for producing laminated glass, in which two glass plates, each with a film layer, are placed one atop another to form a glass package and the glass package is transported to a laminating device and is laminated there under vacuum and melting of the film layer to form laminated glass, wherein after the placement together and before transport, the glass package is at least partially heated in order to fix the glass plates relative to the film. During fixing, pressure can be applied by means of pressure rollers.

DE 3728284 A1 describes aligning two glass panes to be joined using an alignment table and adjustable stops.

DE 4106958 A1 relates to a method for producing curved, glass panes joined to one another having a spacer element inserted between the panes, wherein each pane is brought into contact with a contact surface and, after positionally accurate alignment relative to this contact surface, is fixedly bonded thereto.

In general, the object of the invention is to provide a method for producing a thin laminated glass that overcomes the disadvantages of the prior art methods explained above.

In particular, the object of the invention is to provide a method for producing a thin laminated glass that enables precise and reproducible alignment and fixing of the arrangement of the glass panes while forming a fixed arrangement during automatic, semiautomatic, or manual assembly of the thin laminated glass. In particular, the method should be suitable for the assembly of a thin laminated glass with two glass panes lacking geometric accuracy of fit.

The object is accomplished according to the invention by a method according to claim 1. Preferred embodiments of the invention emerge from the dependent claims.

The method according to the invention enables alignment and fixing of the arrangement of glass panes lacking accuracy of fit while forming a fixed arrangement for production of a thin laminated glass with high precision and reproducibility for automatic, semiautomatic, or manual production.

The method according to the invention is, in particular, suitable with the use of two glass panes which lack geometric accuracy of fit. The above-described difficulties that are caused by such lack of accuracy of fit with the known methods can be overcome by the method according to the invention. Even pairs of glass panes with quite pronounced lack of accuracy of fit can be processed in the method according to the invention.

By means of the method according to the invention, lacking accuracy of fit can be partially reduced or even completely compensated and errors in the alignment in the laminated glass are significantly reduced compared to conventional methods.

Accordingly, the invention relates to a method for producing laminated glass or a precursor thereof using a first glass pane with a thickness of at least 1.4 mm and a second glass pane with a thickness of not more than 1.0 mm, wherein the first glass pane and the second glass pane differ in curvature and/or locally in shape and wherein the method comprises the following steps:

a) aligning an arrangement comprising the first glass pane, the second glass pane, and at least one laminating film situated between the first and second glass pane by positioning at least one side edge of the arrangement against at least one stop element;

b) pre-fixing the aligned arrangement at at least two locations on the positioned side edge of the arrangement by means of one or a plurality of fixing elements and heating, after which the fixing element or elements are removed again; and c) forming a fixed arrangement by passing the pre-fixed arrangement through a roller arrangement, in particular calender roller arrangement, with the pre-fixed side edge of the arrangement ahead, wherein the arrangement is heated, at least in sections, during passage.

The invention is explained in detail in the following.

Here, the term "precursor of a laminated glass" means, in particular, the fixed arrangement obtained according to step c) or the deaerated pre-laminate obtained after the optional deaeration of the fixed arrangement obtained according to step c).

The terms "curvature" or "bend" and "curved" or "bent" are synonymous terms here.

A "roller arrangement" means an arrangement comprising at least one roller pair consisting of two opposing rollers.

The laminated glass can be flat or bent, a bent laminated glass being preferable. The laminated glass can be bent in one or a plurality of spatial directions, as is customary, for example, for motor vehicle windows. Typical radii of curvature can be in the range from approx. 20 mm to approx. 40 m, preferably 50 mm to 30 m.

In the method according to the invention, a first glass pane with a thickness of at least 1.4 mm and a second glass pane with a thickness of not more than 1.0 mm are used. The method thus relates to production of a thin laminated glass. The first glass pane can be flat or curved. The second glass pane can be flat or curved. Glass panes can, for example, be curved by a gravity bending method.

The first glass pane and the second glass pane used differ in curvature and/or locally in shape. As already mentioned, this represents a lack of geometric accuracy of fit of the two glass panes that are to be laminated to form the laminated glass. These differences in curvature and/or locally in shape usually result in the formation of intermediate spaces or gaps in the arrangement when the two glass panes with the at least one laminating film therebetween are placed one atop another to form the arrangement.

In the case of different curvature, the first glass pane can have a greater curvature than the second glass pane and vice versa. A different curvature of the first and second glass pane also includes cases in which one of the two glass panes is flat and the other is curved. The difference in curvature of the two glass panes can be considerable.

Local differences in shape in the first glass pane and second glass pane used represent local shape deviations or shape defects. These can, for example, be bulges, waves, or depressions, as well as inconsistencies in thickness that are present in the glass pane(s). These can, for example, be caused by process technology or result from errors in the manufacturing process. Even with the use of two flat glass panes, such local shape defects can result in a lack of geometric accuracy of fit.

In preferred embodiments, there is a different curvature of the first and second glass pane, with the possible additional existence of local differences in shape.

In a particularly preferred embodiment, the first glass pane used is curved and the second glass pane used is not curved or flat or has less curvature than the first glass pane. Here, the difference in curvature of the two glass panes can be considerable. In extreme cases, the thinner second glass pane has no curvature and the thicker first glass pane has a curvature designed such that the final product (laminated glass) matches the desired CAD shape (computer-aided design shape) as precisely as possible.

The first glass pane preferably has a thickness in the range from 1.4 mm to 5.0 mm, more preferably from 1.6 mm to 2.2 mm. The second glass pane preferably has a thickness in the range from 0.3 to 1.0 mm, more preferably from 0.5 to 0.8 mm.

The first glass pane and the second glass pane can be made of the same material or of a different material. The glass panes can be made of inorganic glass and/or organic glass, i.e., organic polymers. In a preferred embodiment, the first glass pane and/or the second glass pane are made of flat glass, quartz glass, borosilicate glass, soda lime glass, alkali aluminosilicate glass, polycarbonate, and/or polymethacrylate.

The first and/or second glass pane can be made of untempered glass, thermally or chemically partially tempered glass (TVG) or thermally (ESG) or chemically tempered glass.

At least one laminating film, situated between the first and second glass pane in the arrangement, is used to form the arrangement. The at least one laminating film is, in particular, a polymer film, preferably a thermoplastic polymer film. Usually, one or a plurality of laminating films are used. The at least one laminating film serves to join the first glass pane and the second glass pane by bonding to form the laminate or laminated glass.

One or a plurality of laminating films, for example, 1, 2, or 3 laminating films, can be used. Such laminating films are well-known to the person skilled in the art and are commercially available. The laminating film, e.g., a PVB film, has, for example, a thickness of 0.1 to 2 mm and more preferably of 0.3 to 1 mm, typically 0.38 mm or 0.76 mm or 0.81 mm or 0.84 mm.

The laminating film can, for example, be formed from polyvinyl butyral (PVB), ethylene vinyl acetate (EVA), polyurethane, a copolymer thereof, a derivative thereof, or mixtures thereof, PVB films being particularly preferred. In addition to the polymer, the laminating film can optionally contain conventional additives, such as plasticizers or fillers.

In addition to the at least one laminating film, one or a plurality of additional polymer films different from the laminating film and which are also arranged between the first and second glass pane can optionally be used for the arrangement, for example, an infrared reflecting polymer film, for example, a polyester film that optionally has a coating, for example, made of silver.

To form the arrangement comprising the first glass pane, the second glass pane, and at least one laminating film situated between the first and second glass pane, the first glass pane, the at least one laminating film, and the second glass pane are placed one atop another. As mentioned, one or a plurality of additional polymer films may optionally be arranged between the two glass panes.

The method according to the invention includes as step a) aligning the arrangement comprising the first glass pane, the second glass pane, and the at least one laminating film situated between the first and second glass pane by positioning at least one side edge of the arrangement against at least one stop element.

Aligning the arrangement is a customary process in the production of laminated glass and the person skilled in the art is familiar with the necessary measures. Depending on the type of stop elements, one or a plurality of stop elements can be used, expediently, at least three. All customary stop elements can be used, for example, vertically placed cylinders fixed to the floor or to a customary stop device in the desired arrangement.

For alignment, at least one side edge of the arrangement is positioned against at least one stop element by pressing the side edge against the stop element such that the side edge rests against the stop element. In principle, any side edge can be selected for positioning against the stop element; however, expediently, the side edge with the most significance is selected, since the highest accuracy in alignment is obtained on the positioned side edge. In the case of side windows for cars, the side edge with the most significance is, for example, the upper side edge since it can be visible in the installed state.

As a rule, it is preferable for at least two, usually at least three stop elements to be arranged such that the side edge to be pre-fixed can be positioned against at least one, preferably at least two stop elements, and a side edge touching the side edge to be pre-fixed can be positioned against at least one stop element in order to achieve precise alignment.

Figure 2:
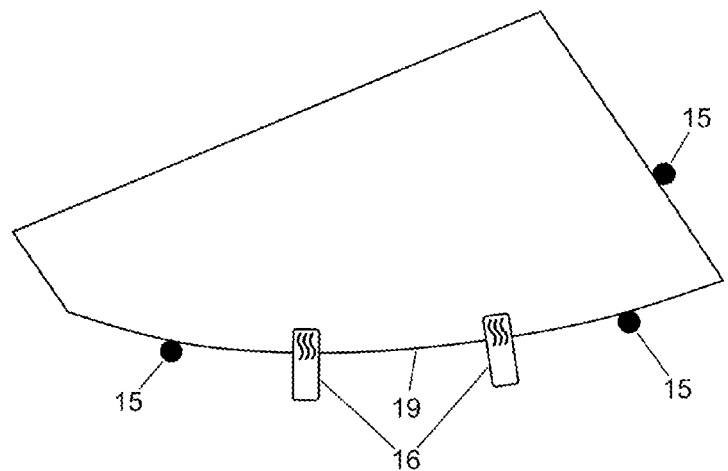

In a preferred embodiment, aligning the arrangement uses at least three stop elements that are arranged such that the side edge to be pre-fixed is positioned against at least two stop elements and another side edge of the arrangement touching the side edge to be pre-fixed is positioned against at least one stop element. Such an embodiment is illustrated in FIG. 2.

After alignment, in b), the aligned arrangement is pre-fixed at two or more locations on the positioned side edge of the arrangement by one or more, usually at least two fixing elements and heating.

The fixing element can optionally be heatable. All means for mechanical fixing familiar to the person skilled in the art can be used as fixing elements. The fixing element can, for example, be a clamp. The clamp can be heatable. A force perpendicular to the glass surface can be applied by means of the fixing element.

The fixing element or elements can be attached at the at least two locations on the positioned side edge and the locations are spot-heated or locally heated during application of a force perpendicular to the glass surface, by which means the pre-fixing of the arrangement is achieved. The spot heating at said locations can be done, for example, by hot air and/or one or a plurality of heated fixing elements, in particular heated clamps. Hot air blowers, for example, can be used to generate the hot air.

By means of the spot heating of the at least two locations, the laminating film becomes adhesive at these locations such that pre-fixing is achieved by local bonding. The appropriate temperature naturally depends on the type of laminating film used. The arrangement is heated, at the locations to be fixed, for example, to a temperature in the range from 30° C. to 140° C., preferably from 40° C. to 100° C. Since the time for heating should be kept as short as possible, the temperature of the hot air and/or of the heated fixing elements is usually significantly higher in order to reach the desired temperature in the arrangement as quickly as possible.

After pre-fixing of the arrangement, the fixing element or elements are again removed from the arrangement, by which means the pre-fixed arrangement is obtained.

Then, in step c), a fixed arrangement is formed by passing the pre-fixed arrangement through a roller arrangement with the pre-fixed side edge of the arrangement ahead, with the arrangement heated at least in sections during passage.

Preferably, the roller arrangement used has a plurality of roller pairs consisting of two opposing rollers arranged next to one another, with, optionally, at least one roller pair heatable.

The roller arrangement is particularly preferably a calender roller arrangement. This preferably has a plurality of roller pairs consisting of two opposing rollers arranged next to one another, with, optionally, at least one roller pair heatable.

During passage, the arrangement is heated at least in sections. In the heated sections of the arrangement, the two glass panes are joined by the laminating film which is adhesive there, by which means the fixed arrangement is obtained. It is, in particular, preferable for the arrangement to be heated during passage only in sections, i.e., not over its entire surface, but only over part of the surface or in strips. In this manner, the arrangement is not bonded over its entire surface but only in sections, by which means subsequent, optionally required deaeration is facilitated.

The arrangement, pre-fixed at least in sections, is heated in step c), preferably by hot air and/or one or a plurality of heated roller pairs of the roller arrangement, in particular, a calender roller arrangement. Hot air blowers, for example, can be used to generate the hot air. The appropriate temperature naturally depends on the type of laminating film used. In step c), the arrangement is heated, at least in sections, preferably only in sections, for example, to a temperature in the range from 30° C. to 140° C., preferably from 40° C. to 100° C.

In a preferred embodiment, the pre-fixed arrangement is heated in sections or strips by using a roller arrangement, in particular a calender roller arrangement having multiple rollers arranged next to each other, wherein some of the roller pairs are not heated and at least one roller pair is heated. If two or more roller pairs are heated, at least one non-heated roller pair is preferably situated in each case between two heated roller pairs.

The contact pressure exerted on the pre-fixed arrangement in the roller arrangement, in particular a calender roller arrangement, relative to the atmospheric pressure can, for example, be 2 to 5 bar, preferably 3 to 4 bar.

The fixed arrangement is formed by passing the pre-fixed arrangement through the roller arrangement, which can in particular be implemented as a calender roller arrangement, under heating at least in sections, preferably in sections.

A further effect can result from the passage of the pre-fixed arrangement through the roller arrangement, which can in particular be implemented as a calender roller arrangement. This consists in that the lacking geometric accuracy of fit of the two glass panes can be compensated. In particular, previously existing differences in curvature of the two glass panes can be compensated. In a preferred embodiment, existing differences in curvature of the first and second glass pane are compensated by the treatment in step c), with the curvature of the thinner second glass pane being completely or partially adapted to the curvature of the thicker first glass pane.

The method according to the invention can also optionally and preferably include a deaeration step, wherein the fixed arrangement obtained in step c) is subjected to a deaeration process while forming a pre-laminate. The deaeration can be done by the known methods, e.g., by a calendering treatment or by a vacuum process, a vacuum process being preferred. In the vacuum method, a vacuum is applied to the fixed arrangement which has been placed, for example, in a vacuum bag or a vacuum frame and residual air is evacuated from the fixed arrangement. During the deaeration process, preferably by the vacuum method, the fixed arrangement is usually also heated.

The method according to the invention can also optionally and preferably include a heat and/or pressure treatment of the pre-laminate obtained after deaeration in order to finish the laminated glass.

This heat and/or pressure treatment of the pre-laminate obtained after deaeration to form the laminated glass can be carried out according to any of the methods well known to the person skilled in the art, with autoclaving being the preferred method.

The laminated glass is preferably a vehicle window, particularly preferably a motor vehicle window. The vehicle can be a land, water, or air vehicle, in particular a passenger car. The laminated glass is preferably a side window for a vehicle, preferably for a motor vehicle.

The invention is explained in detail in the following using nonrestrictive exemplary embodiments with reference to the accompanying drawings.

Figure 3:
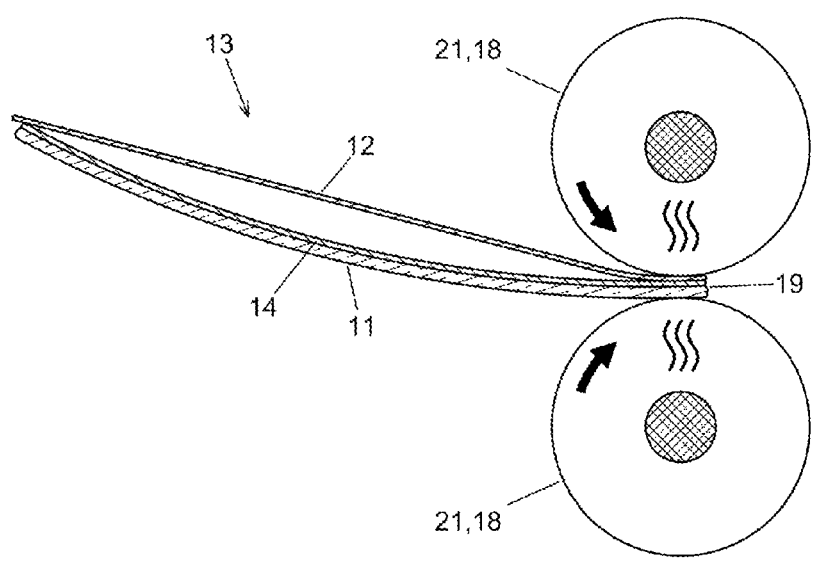
Figure 4:
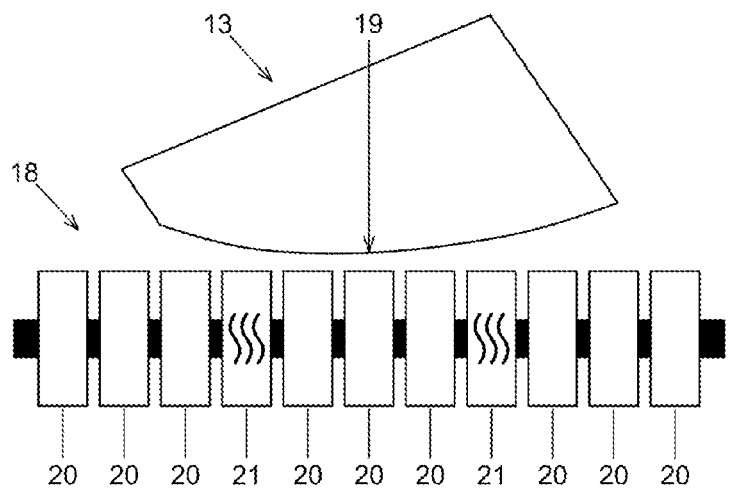
Figure 5:
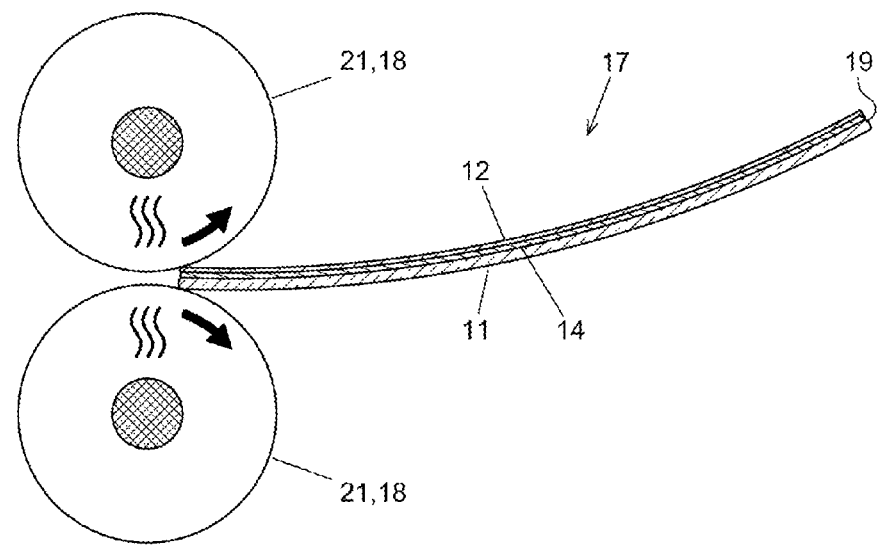

They depict:

FIG. 1 schematically, a side view of the aligned or pre-fixed arrangement in step a) and b) of the method;

FIG. 2 schematically, a plan view of the aligned arrangement during the pre-fixing in step b) of the method;

FIG. 3 schematically, a side view of the pre-fixed arrangement at the beginning of step c) of the method;

FIG. 4 schematically, a plan view of the pre-fixed arrangement at the beginning of step c) of the method;

FIG. 5 schematically, a side view of the arrangement or the fixed arrangement toward the end of step c) of the method.

FIG. 1 schematically depicts a side view of the arrangement 13 comprising a first glass pane 11, a second glass pane 12, and a laminating film 14, e.g., of PVB, during steps a) and b) of the method for producing a vehicle window pane. The first glass pane 11 has a thickness of 1.6 mm and significant curvature. The laminating film 14 is situated between the first glass pane 11 and the second glass pane 12. The second glass pane 12 has a thickness of not more than 1.0 mm, e.g., 0.6 mm, and is planar or not curved. Due to the different curvature, the glass panes 11, 12 lack geometric accuracy of fit. As a result, a gap forms in the arrangement 13.

The upper illustration of FIG. 1 depicts alignment of the arrangement 13 by positioning the side edge 19 of the arrangement 13 against an alignment element 15. The middle illustration of FIG. 1 schematically depicts the pre-fixing of a location of the side edge 19 with a heatable clamp attached as a heatable fixing element 16 for spot heating of the arrangement 13. The lower illustration of FIG. 1 depicts the pre-fixed arrangement 13 with the joined location at the side edge 19.

FIG. 2 depicts a plan view of the aligned arrangement 13 of FIG. 1. It is discernible that the side edge 19 is positioned against two cylindrical stop elements 15 and another side edge touching the side edge 19 is positioned against a third cylindrical stop element 15, by which means the arrangement 13 has been aligned. On the aligned arrangement 13, heatable clamps are attached as a heatable fixing element 16 at two locations on the side edge 19 positioned against the two stop elements. The two locations can be locally joined by means of the heated clamps in order to obtain the pre-fixing.

FIG. 3 depicts the further processing of the pre-fixed arrangement 13 at the beginning of step c). The pre-fixed arrangement 13 is guided through a roller arrangement 18 with the pre-fixed side edge 19 ahead. The side view depicts a heatable roller pair 21 consisting of two opposing rollers. The roller arrangement 18 depicted in FIG. 3 can in particular be a calender roller arrangement.

FIG. 4 depicts the same thing as FIG. 3, in plan view. The roller arrangement 18 has a plurality of roller pairs 20, 21 arranged next to one another, wherein the roller arrangement 18 includes two heatable roller pairs 21 and nine non-heatable roller pairs 20. The pre-fixed arrangement 13 is guided through the roller arrangement 18 perpendicular to the axis on which the roller pairs 20, 21 are arranged next to one another. The roller arrangement 18 depicted in FIG. 4 can in particular be a calender roller arrangement.

FIG. 5 depicts a side view of the fixed arrangement 17 coming out of the roller arrangement 18 in accordance with step c) of the method. The lack of geometric accuracy of fit of the two glass panes 11, 12 has been compensated by the roller treatment. The two glass panes 11, 12 now have the same curvature and are precisely bonded. The gap of the pre-fixed arrangement 13 before the roller treatment has disappeared. Preferably, the roller treatment is a calender treatment.

The fixed arrangement 17 formed can be subjected to a deaeration process and a heat and/or pressure treatment according to the customary methods in order to obtain the finished laminated glass.

LIST OF REFERENCE CHARACTERS 11 first glass pane
12 second glass pane
13 arrangement
14 laminating film
15 stop element
16 fixing element
17 fixed arrangement
18 roller arrangement
19 side edge
20 roller pair
21 heatable roller pair

The invention claimed is:

1. A method for producing laminated glass or a precursor thereof using a first glass pane with a thickness of at least 1.4 mm and a second glass pane with a thickness of not more than 1.0 mm, wherein the first glass pane and the second glass pane differ in curvature and/or locally in shape and wherein the method comprises:

a) aligning an arrangement comprising the first glass pane, the second glass pane, and at least one laminating film situated between the first and second glass pane by positioning at least one side edge of the arrangement against at least one stop element;

b) pre-fixing the aligned arrangement at at least two locations on the positioned side edge of the arrangement with one or a plurality of fixing elements and spot-heating of the at least two locations to form a pre-fixed arrangement comprising the first glass pane, the second glass pane, and the at least one laminating film, and removing the fixing element or elements after said spot-heating; and c) after b), forming a fixed arrangement by passing the pre-fixed arrangement through a roller arrangement with the pre-fixed side edge of the arrangement ahead, wherein the arrangement is heated at least in sections during passage.

2. The method according to claim 1, wherein the first glass pane used is curved and the second glass pane used is not curved or has less curvature than the first glass pane.

3. The method according to claim 1, wherein the first glass pane has a thickness in the range from 1.4 mm to 5.0 mm, and/or the second glass pane has a thickness in the range from 0.3 to 1.0 mm.

4. The method according to claim 3, wherein the thickness of the first glass pane is in the range from 1.6 mm to 2.2 mm, and/or the thickness of the second glass pane is in the range from 0.5 to 0.8 mm.

5. The method according to claim 1, wherein the fixing element is a clamp that is optionally heatable.

6. The method according to claim 1, wherein the roller arrangement has a plurality of roller pairs arranged next to one another and consisting of two opposing rollers, wherein, optionally, at least one roller pair is heatable.

7. The method according to claim 1, wherein the spot-heating in step b) is done by hot air and/or one or a plurality of heated fixing elements.

8. The method according to claim 7, wherein the spot-heating in step b) is done by heated clamps.

9. The method according to claim 1, wherein the heating, at least in sections, of the pre-fixed arrangement in step c) is done by hot air and/or one or a plurality of heated roller pairs of the roller arrangement.

10. The method according to claim 1, wherein in step b), the arrangement is heated, at the locations to be fixed, to a temperature in the range from 30° C. to 140° C., and/or wherein in step c), the arrangement is heated, at least in sections, to a temperature in the range from 30° C. to 140° C.

11. The method according to claim 10, wherein in step b), the arrangement is heated, at the locations to be fixed, to a temperature in the range from 40° C. to 100° C., and/or wherein in step c), the arrangement is heated, at least in sections, to a temperature in the range from 40° C. to 100° C.

12. The method according to claim 1, further including a deaeration step, in which the fixed arrangement obtained in step c) is subjected to a deaeration process.

13. The method according to claim 12, further including a heat and/or pressure treatment of the pre-laminate obtained after the deaeration process to form the laminated glass.

14. The method according to claim 12, wherein the deaeration is done by a vacuum method.

15. The method according to claim 1, wherein in step c), the arrangement is heated in sections during passage through the roller arrangement.

16. The method according to claim 1, wherein the roller arrangement is a calender roller arrangement.

17. The method according to claim 1, wherein the laminated glass is a vehicle window.

18. The method according to claim 17, wherein the vehicle window is a motor vehicle window.

19. The method according to claim 17, wherein the vehicle window is a side window of a vehicle.

20. The method according to claim 1, wherein the laminated glass is a bent laminated glass.

* * * * *

UNITED STATES PATENT AND TRADEMARK OFFICE
CERTIFICATE OF CORRECTION

PATENT NO. : 11,511,526 B2
APPLICATION NO. : 16/757132
DATED : November 29, 2022
INVENTOR(S) : Nikolai Borchmann et al.

It is certified that error appears in the above-identified patent and that said Letters Patent is hereby corrected as shown below:

On the Title Page

In Item (54) and in the Specification, Column 1, Lines 1-5, Title, should read:
IMPROVED ALIGNING AND LAMINATING METHOD FOR THE PRODUCTION OF THIN
LAMINATED GLASS FROM GLASS PANES WHICH DO NOT FIT TOGETHER ACCURATELY Signed and Sealed this
Twenty-fourth Day of January, 2023

Katherine Kelly Vidal
*Director of the United States Patent and Trademark Office*